(12) United States Patent
Krishnamoorthy et al.

(10) Patent No.: US 6,839,334 B1
(45) Date of Patent: Jan. 4, 2005

(54) CONTROL CHANNEL FOR TIME DIVISION MULTIPLE ACCESS SYSTEMS

(75) Inventors: Rajeev Krishnamoorthy, Middletown, NJ (US); Markus Rupp, Lincroft, NJ (US); Harish Viswanathan, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/312,793

(22) Filed: May 17, 1999

(51) Int. Cl.[7] .............................................. H04B 7/216
(52) U.S. Cl. ........................ 370/335; 370/342; 370/347; 370/464
(58) Field of Search ................................. 370/335, 337, 370/342, 344, 336, 345, 347, 364, 465; 375/200, 130

(56) References Cited

U.S. PATENT DOCUMENTS

| | | | | |
|---|---|---|---|---|
| 5,260,967 A | * | 11/1993 | Schilling | 370/342 |
| 6,009,087 A | * | 12/1999 | Uchida et al. | 370/335 |
| 6,115,368 A | * | 9/2000 | Schilling | 370/335 |
| 6,532,365 B1 | * | 3/2003 | Anderson et al. | 455/437 |

FOREIGN PATENT DOCUMENTS

| | | | | |
|---|---|---|---|---|
| EP | 0 668 664 A | | 8/1995 | H04B/7/26 |
| EP | 0 701 337 A2 | | 3/1996 | H04B/7/26 |

OTHER PUBLICATIONS

EP Patent Application (EP 0 668 664 A1) Nakano, Takayuki Jan. 16, 1995.*
European Patent Office Search Report, Application No. 00303906.2–2211, The Hague, Sep. 20, 2000.

* cited by examiner

Primary Examiner—Nick Corsaro
Assistant Examiner—John J Lee
(74) Attorney, Agent, or Firm—Eugene J. Rosenthal (57) ABSTRACT

In a TDMA system a multifunction control channel is employed that carries data used for implementing channel access functionality for users and is also employed at the remote terminals in the performance of modem functionality. In other words, information necessary to accurately receive data on the user traffic channels is obtainable by processing the multifunction control channel. This is achieved by arranging the broadband channel of the TDMA system as a repeating frame having time slots in which at least one time slot is reserved for use as the multifunction control channel, and the data that is transmitted on the multifunction control channel is encoded using a spread spectrum format. To this end the data carried on the multifunction control channel is encoded in a way that uses each symbol of the multifunction control channel as if it were a so-called spread spectrum "chip". At least one of the remaining time slots of the frame, and preferably all of the remaining time slots, which are typically used to carry user traffic arranged as logical channels, are not spread spectrum encoded. With regard to modem functionality, the remote terminals use the received multifunction control channel to a) perform frame synchronization, i.e., frame timing, b) perform frequency offset estimation, c) obtain an estimate of the channel impulse response, and d) estimate the received signal strength for use in gain control.

28 Claims, 3 Drawing Sheets

CONTROL CHANNEL FOR TIME DIVISION MULTIPLE ACCESS SYSTEMS

TECHNICAL FIELD

This invention relates to the art of wireless systems, and in particular, to fixed wireless loop, or so-called "wireless local loop" systems.

BACKGROUND OF THE INVENTION

A problem in the art of wireless communications is the need to establish initial access and synchronization of each remote terminal with the base station currently serving it. One prior art solution to this problem for time division multiple access (TDMA) systems—such as systems implementing the Groupe Special Mobile (GSM) standards and the North American TDMA standard IS-136—is to employ one or more separately dedicated control channels that are distinct in frequency from the time shared channels utilized for user traffic. This approach does not permit performance of modem functionality for user traffic channels based on the control channel characteristics. In other words, user traffic channel characteristics cannot be reliably determined from the control channels. This is because the environmental effects which affect the frequencies of the control channels may not similarly affect the user traffic channels. Also, disadvantageously, in such prior art systems, because the number of control channels are fixed, only a limited number of remote terminals may be able to access the system, e.g., to request new service, enhanced bandwidth, or reduced bandwidth, at any one time.

SUMMARY OF THE INVENTION

The foregoing problems with the prior art of establishing initial access and synchronization of remote terminals with a base station in a TDMA system are reduced, or eliminated, by employing a multifunction control channel that carries data used for implementing channel access functionality for users and is also employed at the remote terminals in the performance of modem functionality. In other words, information necessary to accurately receive data on the user traffic channels is obtainable by processing the multifunction control channel. This is achieved, in accordance with the principles of the invention, by arranging the channel of the TDMA system as a repeating frame having time slots in which at least one time slot is reserved for use as the multifunction control channel, and the data that is transmitted on the multifunction control channel is encoded using a spread spectrum format. To this end the data carried on the multifunction control channel is encoded in a way that uses each symbol of the multifunction control channel as if it were a so-called spread spectrum "chip". In accordance with an aspect of the invention, at least one of the remaining time slots of the frame, and preferably all of the remaining time slots, which are typically used to carry user traffic arranged as logical channels, are not spread spectrum encoded.

Although there is a disadvantage in performing such spread spectrum encoding of the multifunction control channel data, in that doing so reduces the overall bit rate that can be achieved thereon, this disadvantage is small, in that the multifunction control channel is typically lightly used. Furthermore, the disadvantage is offset by the significant advantages that are achieved. For example, one such advantage is a reduction or elimination in the interference between the multifunction control channels of one base station and those of its neighbors, each of which is spread using a different spreading code. In addition, by spreading the symbols, the intersymbol interference due to multipath is reduced.

With regard to modem functionality, the remote terminals use the received multifunction control channel to a) perform frame synchronization, i.e., frame timing, b) perform frequency offset estimation, c) obtain an estimate of the channel impulse response, and d) estimate the received signal strength for use in gain control. In particular, the qualities of the multifunction control channel resulting from it being spread spectrum encoded are employed by the remote terminals to identify the location of the multifunction control channel, which is located at one or more known fixed time slots within the repeating frame. Once the location of the multifunction control channel time slot is identified, the frame boundaries may be determined. Thereafter, it is possible to perform frequency offset estimation based on the contents of the multifunction control channel. Such frequency offset estimation is improved in quality because the spread spectrum encoding reduces intersymbol interference. An estimate of the channel impulse derived from the multifunction control channel may be sent to the transmitter, which can perform appropriate predistortion on both the multifunction control channel and the user traffic channels to compensate for the effects of the channel, advantageously improving system performance. The multifunction control channel power level as received at each remote terminal is also used to estimate received signal strength.

In the downlink the multifunction control channel is referred to as a beacon channel, in that it is broadcast to the remote terminals in a sector, if sectorization is employed, or to all the remote terminals if sectorization is not employed. In the uplink each multifunction control is referred to as an access channel, in that it is used for communicating user requests for access to traffic channels. The multifunction control channel may contain various messages at different times, such as incoming call information, link status information, access requests, responses to control messages, and slot assignment information.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Figure 1:
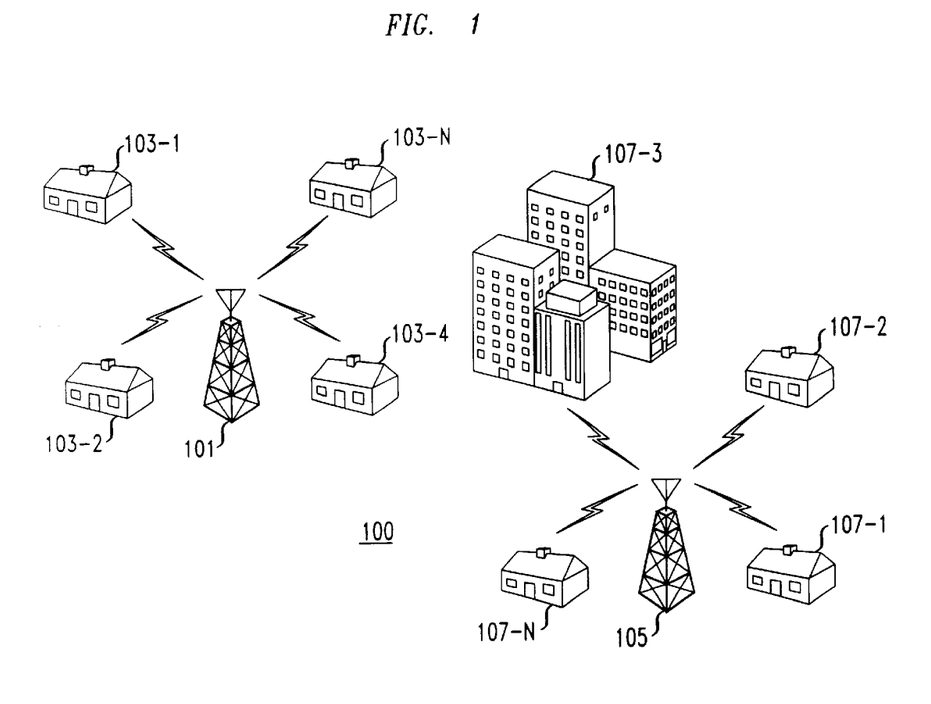
FIG. 1 shows exemplary steerable beam TDMA wireless communication system 100 arranged in accordance with the principles of the invention.

FIG. 1 shows exemplary steerable beam TDMA wireless communication system 100 arranged in accordance with the principles of the invention. Wireless communication system 100 includes base station antenna 101 serving remote terminals 103-1 through 103-N, collectively remote terminals 103, and base station antenna 105 serving remote terminals 107-1 through 107-N, collectively remote terminals 107. The pairing of a remote terminal with a particular base station is determined by the implementor based on the best signal power and least interference that can be achieved for a remote terminal-base station pair.

In steerable beam wireless communication system 100, the beam pattern formed at the remote terminal location may be of any arbitrary width. The particular width of the beam is a function of the directionality of the antenna design and often it is a wide beam. Typically the same beam pattern is used for both transmitting and receiving. For example, an antenna at the remote terminal location having a 30° angle has been employed in one embodiment of the invention, although any other angle may be used.

The base station has the ability to controllably form beam patterns of substantially arbitrary width, so as to listen and transmit on either a wide beam or on a narrow beam, depending on the situation. Initially, e.g., during call setup, communication between a base station and a remote terminal is carried out by having the base station use a wide beam. However, once a communication channel is established between a base station and a remote terminal, i.e., a so-called "traffic" channel, the base station typically uses a narrow beam. When using a narrow beam, the base station directs the beam in the direction of the remote terminal at the time communication is to take place between the base station and the remote terminal. Communication may be simultaneously bidirectional between the base station and the remote terminal, e.g., one frequency is used for transmission from the base station to the remote terminal while a second frequency is used for transmission from the remote terminal to the base station.

Figure 2:
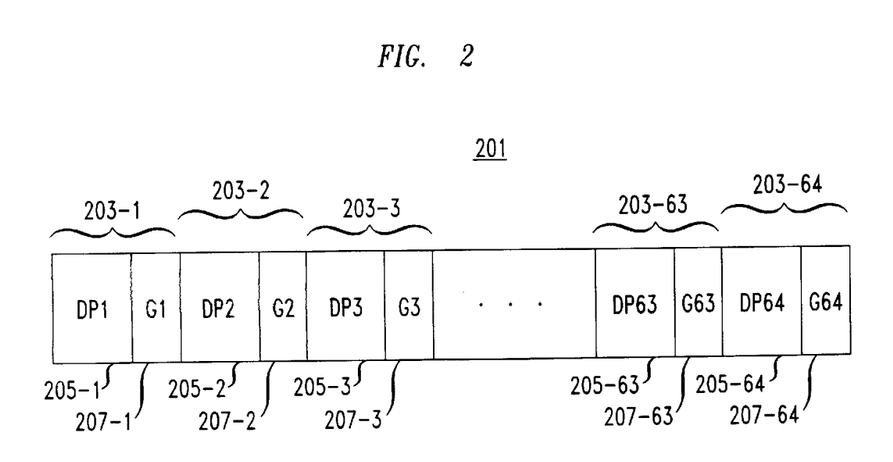
FIG. 2 shows an exemplary frame structure for use in the steerable beam wireless communication system of FIG. 1.

Steerable beam wireless communication system 100 of FIG. 1 is a time division multiple access (TDMA) system. Such systems employ a repeating frame structure, within each frame there being time slots. FIG. 2 shows an exemplary frame structure 201 for use in steerable beam wireless communication system 100. Frame structure 201 is 2.5 ms long and contains within it 64 time slots 203, including time slots 203-1 through 203–64. Each of time slots 203 includes a data part (DP) 205 and a guard interval (G) part 207. For example, each of time slots 203 is 2.5/64 ms, which is 39.0625 µs. Each guard interval 207 is 2 µs leaving each data part 205 as being 37.0625 µs. The same frame structure is used for both the uplink, i.e., from the remote terminal to the base station, and for the downlink, i.e., from the base station to the remote terminal.

More specifically, each time slot 203 is divided into symbols, the number of which is determined by the implementor based on bandwidth and the time slot period. For example, as noted above, a 39.0625 µs. time slot period with a guard interval of 2 µs leaves a data part of 37.0625 µs. If the channel bandwidth is 5 MHz, and the useful bandwidth 3.9936 MHz, then there are 148 symbols, each of length approximately 250.04 ns. In accordance with the principles of the invention, one or more of time slots 203 in various designated ones of frames 201 may be designated for use as a multifunction control channel that carries data used for implementing channel access functionality for users and is also employed at the remote terminals in the performance of modem functionality. Note that a time slot designated as a multifunction control channel may, but need not appear in each frame 201, and that more than one time slots 203 may be designated for use as a multifunction control channel within the same frame 201. The overall bandwidth of the multifunction control channel is a function of the total number of time slots that are designated for use as the multifunction control channel within a period of time. For example, time slot 203-3 may be designated for use as the multifunction control channel in a first frame 201, time slots 203-2 and 203-64 may be designated for use as the multifunction control channel in a second frame 201, and no time slot is designated for use as the multifunction control channel in a third frame 201. Thus, as used herein, within the rubric of the term "frame structure" is included the idea that is sometimes referred to as a superframe, i.e., the frame is defined as being bounded by a known regularly repeating time slot, although other smaller frames may be included therein.

In accordance with the principles of the invention, the multifunction control channel has the data that is transmitted thereon encoded using a spread spectrum format. This is achieved by encoding the data carried on the multifunction control channel in a way that uses each symbol of the multifunction control channel as if it were a spread spectrum chip. In accordance with an aspect of the invention, at least one of the remaining time slots of the frame, and preferably all of the remaining time slots, which are typically used to carry user traffic arranged as logical channels, are not spread.

The number of bits per symbol when transmitted in a time slot that is not spread spectrum encoded is a function of the modulation scheme that is used. The particular modulation scheme used at any one time is determined by the implementor.

For each time slot designated for use by the multifunction control channel, the symbols are grouped together to form a spread spectrum codeword, i.e., a symbol that has been spread using a spreading code. In other words, each symbol of the multifunction control channel functions as if it were a so-called spread spectrum "chip". For example, each group of 7 symbols may be grouped together to form a spread spectrum codeword. Within a geographic region each base station is assigned its own unique spreading code. The spreading codes may be reused in a different geographic region. Each codeword corresponds to an unspread symbol in a modulation scheme designated for the multifunction control channel, which may be different from the modulation scheme used for the unspread time slots. A time slot of 148 symbols using groups of 7 symbols can contain 21 spread spectrum codewords with 1 unused symbol left over. Such an unused symbol may be filled with dummy data.

For example, using binary phase shift keying (BPSK) if the spreading code for base station 101 using a grouping of 7 symbols is [+1][+1][+1][−1][−1][+1][−1], to transmit the unspread BPSK symbol sequence of [+1][+1][−1][+1]— note that less than 21 symbols are being shown for clarification of exposition purposes only—the time slot of the multifunction control channel would contain [+1][+1][+1] [−1][−1][+1][−1][+1][+1][+1][+1][−1][−1][+1][−1][−1][−1][−1][−1][+1][+1][−1][+1][+1][+1][−][−1][−1][+1][−1], which is the corresponding spread spectrum representation.

If quadrature phase shift keying (QPSK) is used it is necessary to perform the spreading individually on the in-phase and quadrature channels so that the correlation can be performed upon each quadrature channel separately. To this end, the unspread bit sequence is grouped into dibits, for example, the aforementioned sequence of [+1][+1][−1][+1] would be grouped as [+1][+1] and [−1][+1]. Each dibit is then mapped to a QPSK symbol. Thereafter, for each QPSK symbol, the in-phase and quadrature channels are respectively encoded into a pair of spread spectrum codewords using the spreading code assigned to the base station. The resulting spread information is then carried on the respective in-phase and quadrature channels. Those of ordinary skill in the art will readily be able to use other modulation schemes.

Although there is a disadvantage in performing the spread spectrum encoding of the multifunction control channel data, in that doing so reduces the overall bit rate that can be achieved thereon, this disadvantage is small, in that the multifunction control channel is typically lightly used. Furthermore, the disadvantage is offset by the significant advantages that are achieved. For example, one such advantage is a reduction or elimination in the interference between the multifunction control channels of one base station and those of its neighbors, each of which is spread using a different spreading code. In addition, by spreading the symbols, the intersymbol interference due to multipath is reduced.

In the downlink the multifunction control channel is referred to as a beacon channel, in that it is broadcast to the remote terminals in a sector, if sectorization is employed, or to all the remote terminals if sectorization is not employed. In the uplink each multifunction control is referred to as an access channel, in that it is used for communicating user requests for access to traffic channels. The multifunction control channel may contain various messages at different times for use in controlling and coordinating operation of communication system 100 (FIG. 1). Often, these messages are self contained within one spread spectrum encoded time slot that is used for the multifunction control channel. Such messages include incoming call information, link status information, access requests, responses to control messages, and slot assignment information, including identification of which time slot within the frame a particular spread spectrum encoded time slot is.

In a receiver, various uses are made of the multifunction control channel, such as a) estimation of frame timing, b) determination of frequency offset, c) communication of data, e.g., for call setup, d) channel impulse response estimation, and e) determining received signal strength.

Figure 3:
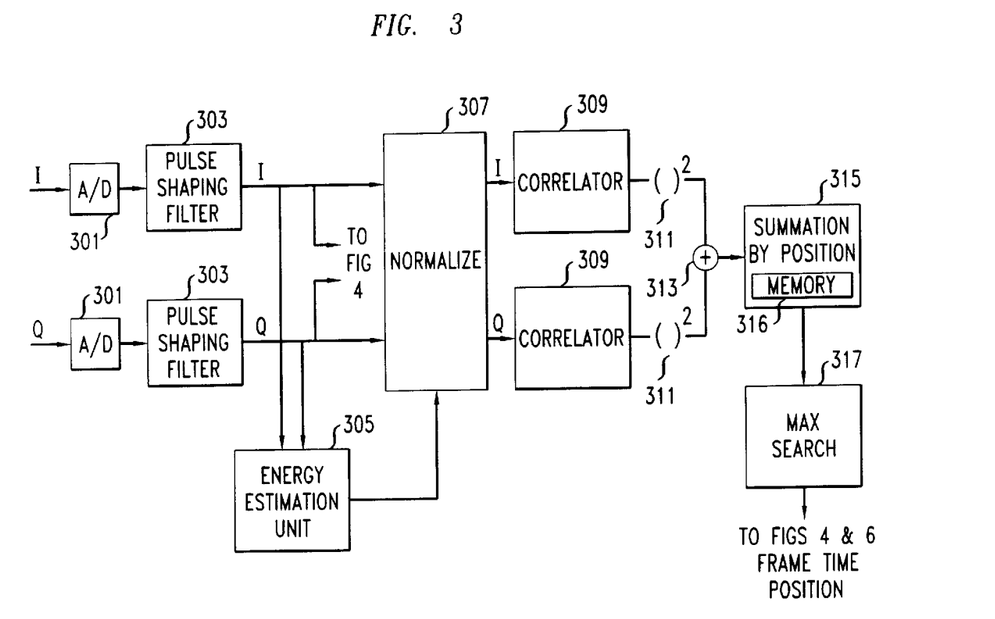
FIG. 3 shows an exemplary arrangement for performing estimation of frame timing in accordance with an aspect of the invention.

Estimation of frame timing is performed initially upon activating a remote terminal, e.g., on powering up of the remote terminal or whenever communication with the base station is lost. FIG. 3 shows an exemplary arrangement for performing estimation of frame timing in accordance with an aspect of the invention when using QPSK. Those of ordinary skill in the art will readily recognize how to apply the principles of the invention to be able to use other modulation schemes.

The arrangement shown in FIG. 3 operates only after downconversion to baseband has been completed for both the in-phase (I) and quadrature (Q) signals. The I and Q baseband signals are received by respective ones of analog-to-digital converters (A/D) 301 and are converted to the digital domain. A new digital value is generated for each symbol period for each of I and Q. The digital I and Q signals are supplied to respective ones of pulse shaping filters 303 for conventional pulse shaping.

If the time coherence of the channel is expected to be shorter than the duration of a TDMA frame, normalization of the energy is required. Normalization of the energy is also required because the multifunction control channel is transmitted from the base station as a wide beam signal while the traffic channels are transmitted from the base station as narrow beam signals, as noted above. To this end, the pulse shaped I and Q signals are supplied both to energy estimation unit 305 and to normalizer 307.

Energy estimation unit 305 determines the average energy of the received signal, e.g., over the duration of one of time slots 203 (FIG. 2). Energy estimation unit 305 (FIG. 3) supplies its current energy estimation to normalizer 307. Normalizer 307 divides each of the received pulse shaped I and Q samples by the average energy received from energy estimation unit 305. The normalized I and Q samples are supplied to a respective one of correlators 309.

Each of correlators 309 performs a correlation between the codeword stored in the remote terminal that is used by the base station with which the remote terminal is supposed to be communicating and the previous samples that number the same as the length of the codeword. The output of each of correlators 309 is then squared by squarers 311. The sum of the squares is then added by adder 313 and the result is supplied to summation by position unit 315 which adds it to the value stored in a memory location of memory 316 that corresponds to its "chip" position within the spread codeword. For each chip position within a frame time period, the summation process continues for the length of one time slot.

At the end of one frame time max search unit 317 chooses the memory location that has the maximum summation value. The number of the position is supplied as an output to be used as a baseline for reference timing purposes.

In one efficient embodiment of the invention the estimation of frame timing is performed without requiring the use of the division operation by normalizer 307.

Mathematically, in order to locate the multifunction control channel, a correlation operation is used, as noted above. More specifically, if the received signal is denoted by r(n), then the correlation operation for chip position k is given by $$x(k) = \sum_{i=0}^{L-1} b(i)r(k-i),$$

where b(n) is the spreading code, of length L, stored in the remote terminal that is used by the base station with which the remote terminal is supposed to be communicating. In order to find the location of the first chip of the multifunction control channel, the magnitude of N such filter outcomes, where N is the number of codewords in a time slot, are added, as follows $$X(k) = \sum_{i=0}^{N-1} |x(k+iL)|^2.$$

Energy estimate P(k) is then obtained by computing $$P(k) = \sum_{i=0}^{NL-1} |r(k+i)|^2.$$

The computation of X(k) and P(k) for different values of k may be performed recursively using the Karp-Rabin algorithm, which was published in the article *Efficient Randomized Pattern-Matching Algorithms* by R. M. Karp and M. O. Rabin, published in IBM J. Res. Dev. 31(2):249–260, 1987, which is incorporated herein by reference in its entirety.

The chip position that achieves the maximum value of $X(k)/P(k)$, i.e., $$k_b = \arg\left(\max \frac{X(k)}{P(k)}\right),$$

where k ranges over one frame time, is identified as the start of the multifunction control channel.

The maximum search through a list of ratios $X(k)/P(k)$ can be done recursively by comparing the recent value with a temporary maximum as follows: define I to be the index of the maximum of the list of ratios. Further, define $I^{(m)}$ to be the current value of the index after the first m steps, i.e., $$I^{(m)} = \arg\left(\max_{k=1,\ldots,m} \frac{X(k)}{P(k)}\right).$$

Then, the recursive search is done by $$I^{(m+1)} = \operatorname{argmax}\left(\frac{X(I^{(m)})}{P(I^{(m)})}, \frac{X(m+1)}{P(m+1)}\right).$$

This means that if the current value, $$\frac{X(m+1)}{P(m+1)},$$

is larger than the temporary one, $$\frac{X(I^{(m)})}{P(I^{(m)})},$$

then $I^{(m+1)}=m+1$. Otherwise, $I^{(m+1)}=I^{(m)}$. Therefore, the value of I is changed only if $$\frac{X(m+1)}{P(m+1)} > \frac{X(I^{(m)})}{P(I^{(m)})}.$$

One way of expressing this process using pseudocode is shown in Table 1.

TABLE 1

| |
|---|
| if $\frac{X(m+1)}{P(m+1)} > \frac{X(I^{(m)})}{P(I^{(m)})}$ then |
| $\quad I^{(m+1)} = m + 1$ |
| else |
| $\quad I^{(m+1)} = I^{(m)}$ |
| endif |

However, since only the location is important, and not the ratio itself, the division operation can be avoided by making the equivalent comparison $$X(m+1)P(I^{(m)}) > X(I^{(m)})P(m+1);$$

The corresponding pseudocode is shown in Table 2. Advantageously, the division operation is replaced by the much cheaper multiplication operation. Doing so is believed to be better even though now four values need to be stored rather than two.

TABLE 2 if $X(m + 1)P(I^{(m)}) > X(I^{(m)})P(m + 1)$ then
    $I^{(m+1)} = m + 1$
else
    $I^{(m+1)} = I^{(m)}$
endif If the spreading codes are chosen to have good autocorrelation properties, for example Barker codes, then the timing information derived from these words can also be used for symbol timing recovery. This is because in such a case the foregoing procedure provides information on the exact starting point of a time slot rather than merely a relatively coarse information of the multifunction control channel beginning $k_b$.

The now available power signal $P(k_b)$ can also be used to control the receiver input power using an automatic gain control (AGC).

Figure 4:
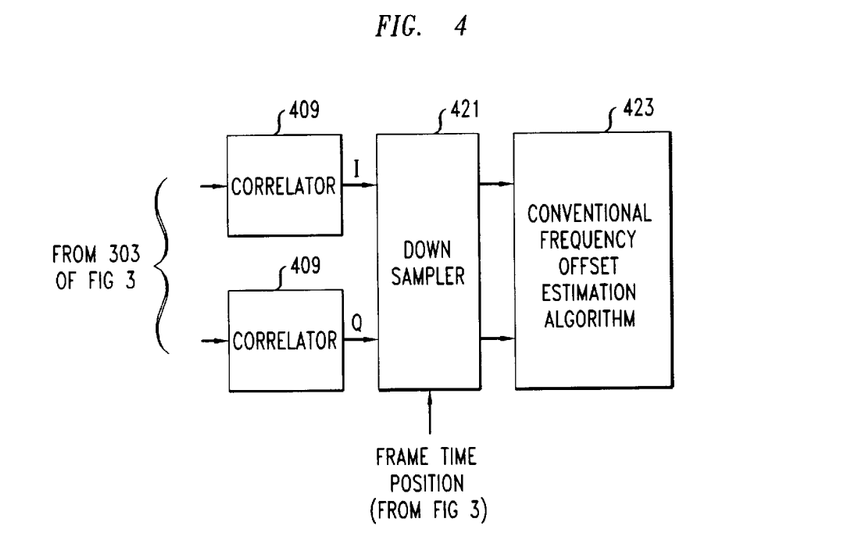
FIG. 4 shows an exemplary arrangement for determining frequency offset in accordance with an aspect of the invention.

Determination of frequency offset is performed initially upon activating a remote terminal, e.g., on powering up of the remote terminal, or whenever communication with the base station is lost. FIG. 4 shows an exemplary arrangement for determining frequency offset in accordance with an aspect of the invention. In FIG. 4 each of correlators 409 is supplied with a respective one of the pulse shaped I and Q which are output from pulse shaping filters 303. Each of correlators 409 performs a correlation between the codeword stored in the remote terminal that is used by the base station with which the remote terminal is supposed to be communicating and the previous samples that number the same as the length of the codeword.

Downsampler 421 takes the outputs of correlators 409 and downsamples, i.e., decimates, them by the number of chips in the spreading code. The timing of the downsampling may be a function of the output of max search unit 317 (FIG. 3). In other words, the output of max search unit 317 is used to establish the timing by which the downsampling, based on the number of chips, takes place.

The downsampled I and Q values developed by downsampler 421 are supplied as an output to a conventional frequency offset estimation algorithm, which operates at the decimated rate. Advantageously, when using a spreading code that is at least as long as the span of the channel impulse response, multipath interference is essentially eliminated. The frequency offset that is determined is sufficient to enable further processing of the received signal without requiring further explicit frequency offset determination.

Note that typically only the remote terminals need to perform estimation of frame timing in order to synchronize with the base station, which is viewed as the master. Once the remote terminal has synchronized with the base station the remote terminal performs timing compensation so that that which it transmits to the base station matches the frame timing of the base station. Similarly, only the remote terminals need to perform determination of frequency offset in order to synchronize its carrier with the base station, which is viewed as the master. Once the remote terminal has synchronized its carrier with the base station the remote terminal performs frequency offset compensation so that that which it transmits to the base station matches the carrier frequency of the base station.

Once the estimation of frame timing and the frequency offset compensation have been performed, those of ordinary skill in the art will readily recognize that it is possible to begin to extract data, both from the multifunction control channel and from the traffic channels. Advantageously, the multifunction control channel is a very robust channel, e.g., as compared with the traffic channels, because of the spreading of the information that is transmitted thereon.

In another embodiment of the invention, the correlation and downsampling functions may be combined so that the correlator functionality is performed only at intervals equal to the length of the spreading code.

Figure 5:
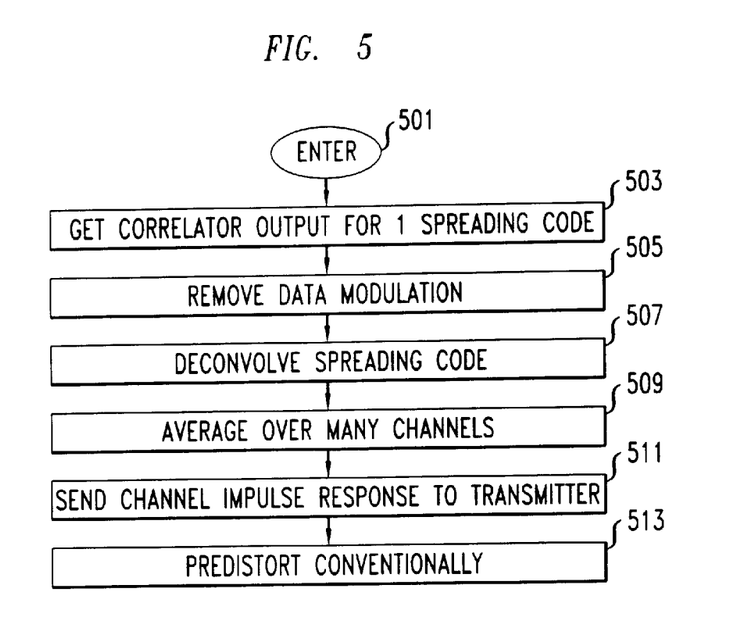
FIG. 5 shows an exemplary process for obtaining an estimate of the channel impulse response in accordance with an aspect of the invention.

FIG. 5 shows an exemplary process for obtaining an estimate of the channel impulse response in accordance with an aspect of the invention. Once the estimate of the channel impulse response is obtained it may be used to implement a predistortion on the transmitted signal so as to compensate for the channel impulse response, thereby improving receiver performance. The process of FIG. 5 is entered in step 501, which must be at some point after estimation of frame timing and the frequency offset compensation have been performed and the information encoded in each of the codewords has been recovered. Next, in step 503, the output of correlators 409 are obtained for 1 spreading code. Thereafter, in step 505, the data modulation is removed from the correlator outputs so that further processing is done without any data modulation.

In optional step 507 the modulation free outputs are deconvolved with the spreading code. This step, which strips out the sidelobes of the autocorrelation function is useful where the spreading code is a relatively small number of chips, e.g., 10 or less. For longer length spreading codes the difference between the peak and sidelobe values of the autocorrelation function is sufficiently large that this step does not contribute any significant improvement to the process.

The resulting channel impulse response is then used to contribute to a running channel impulse response average in step 509. The average channel impulse response is transmitted, e.g., periodically, to the transmitter in step 511, which uses the information to perform appropriate predistortion in the transmitter in step 513.

The multifunction control channel may also be used to determine the received signal strength so that proper gain control may be employed. This is performed by measuring the received signal strength at least when the remote terminal is receiving the multifunction control channel, the timing of which is known as it was previously determined. Advantageously, no traffic channels need be established in order to determine the received signal strength, and no additional symbols are required in the traffic channels once they are established for the performance of gain control.

Figure 6:
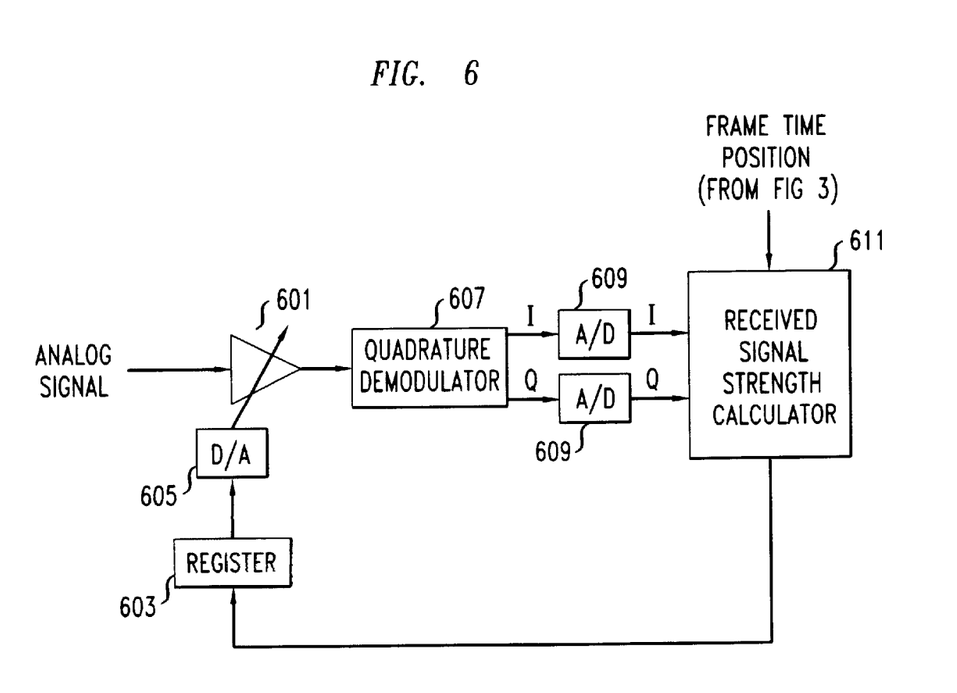
FIG. 6 shows a particular arrangement for determining the received signal strength and for setting the gain level appropriately to fully utilize the dynamic range of the analog-to-digital converter thereby minimizing quantization noise, in accordance with an aspect of the invention.

FIG. 6 shows a particular arrangement for determining the received signal strength and for setting the gain level appropriately to fully utilize the dynamic range of the analog-to-digital converter thereby minimizing quantization noise, in accordance with an aspect of the invention. The analog signal from the radio receiver, e.g., after having been down-converted to intermediate frequency (IF), is supplied to variable gain amplifier 601. The gain of variable gain amplifier 601 is set as a function of the value stored in register 603, which is converted to analog form by digital-to-analog converter (DIA) 605. An initial value for register 603 may be arbitrarily selected by the implementor since operation of the arrangement of FIG. 6 will eventually drive the value to be the correct one. The amplified IF signal is quadrature demodulated by quadrature demodulator 607, which supplies as an output I and Q signals. The I and Q signals are converted to the digital domain by respective ones of analog-to-digital converters (A/D) 609. The digitized I and Q signals are supplied to received signal strength calculator 611.

Received signal strength calculator 611 adds all the squares of the received samples, but only when the multi-function control channel is being received, e.g., as indicated by the output of max search 317 (FIG. 3). The average of the sum of the squares is then determined, and it is divided by the value currently stored in register 603. The result is then stored as the new value of register 603. The process continues to repeat itself each time the multifunction control channel is received.

What is claimed is:

1. A method for use in a transmitter of a time division multiple access (TDMA) wireless system employing a frame structure which repeats, with timeslots being defined within said frame structure, the method comprising the steps of:
   placing information not encoded in a spread spectrum format within at least one timeslot of said instantiation of said frame structure, said at least one timeslot being for use in carrying user traffic;
   placing information encoded in a spread spectrum format within at least one reserved time slot of an instantiation of said frame structure for use as a control channel;
   wherein said spread spectrum encoded information is encoded using symbols of said at least one reserved time slot as spread spectrum chips.

2. A method as claimed in claim 1 further comprising the step of generating said instantiation of said frame structure prior to performance of said placing steps.

3. A method as claimed in claim 1 further comprising the step of performing predistortion on information in said frame structure at said transmitter to precompensate for a channel impulse response.

4. A method as claimed in claim 1 further comprising the step of transmitting said instantiation of said frame structure, wherein said at least one time slot containing information in spread spectrum format is transmitted using a wide radio beam and said at least one timeslot containing information not in spread spectrum format is transmitted using a narrow radio beam.

5. A method as claimed in claim 1 further comprising the step of transmitting said instantiation of said frame structure.

6. A method as claimed in claim 1 further comprising the step of transmitting said instantiation of said frame structure, wherein said at least one time slot containing information in spread spectrum format is transmitted using a wide a radio beam and said at least one timeslot containing information not in spread spectrum format is transmitted using a narrow radio beam; and comprising the step of spread spectrum encoding information to be transmitted on said control channel using symbols of said at least one reserved time slot as spread spectrum chips.

7. A method as claimed in claim 1 wherein said frame is a frame within a superframe structure.

8. A method for use in a receiver of a wireless system, the method comprising the step of
   identifying a chip position that likely corresponds to an alignment of a spreading codeword stored in said receiver and a set of symbols that are processed as if they are spread spectrum chips, wherein said wireless system has time slots that are arranged into frames, each of said frames comprising (i) at least one time slot used as a control channel that contains information that is spread spectrum encoded using symbols of said at least one control channel time slot as spread spectrum chips mad (ii) at least one time slot that is not spread spectrum encoded, said set having a length of one of said frames.

9. A method as claimed in claim 8 further comprising the step of performing at least one modem function.

10. A method as claimed in claim 9 wherein said at least one modem function is selected from the group consisting of performing frame synchronization, performing frequency offset estimation, obtaining an estimate of channel impulse response, and estimating receive signal strength.

11. A method as claimed in claim 10 further comprising the step of adjusting a gain of said receiver as a function of said receive signal strength.

12. A method as claimed in claim 8 wherein said identified chip position indicates a start of said frame.

13. A method as claimed in claim 8 wherein said identifying step comprises the steps of:
   developing an estimate of the energy within a single time slot period for both in-phase and quadrature components of a received signal containing a frame;
   determining a value indicative of a correlation between a potential received codeword and a codeword stored in said receiver for both in-phase and quadrature components of a received signal containing a frame;
   squaring each of said correlation values and summing the resulting squared values;
   adding said squared summed value to a one of a plurality of memory locations that corresponds to a current chip position with said spread codeword; and
   identifying as said chip position the chip position that corresponds to a one of said memory locations that has maximum value.

14. A method as claimed in claim 8 wherein said identified one of said at least one time slots that contains information that is spread spectrum encoded indicates which timeslot of said frame it is.

15. A method as claimed in claim 8 wherein said frame is a superframe.

16. A method as claimed in claim 8 wherein said identifying step comprising the steps of:
   storing samples from a received signal for one frame duration;
   correlating each of the spread spectrum codewords that could fit within a time slot duration starting at a particular chip point with the spread spectrum sequence;
   squaring the output of each correlation performed in said correlating step;
   summing the squared outputs;
   obtaining an energy estimate over said time slot duration;
   searching for a maximum ratio of said squared sum and said energy estimate over said frame duration; and
   identifying as said chip position the chip position having said maximum ratio.

17. A method as claimed in 16 wherein said step of obtaining an energy estimate over said time slot duration comprises the steps of:
   squaring the value of every sample within said time slot duration to produce squared sample values; and
   summing said squared sample values.

18. A method as claimed in 16 wherein said step of searching for the maximum ratio is performed recursively.

19. A method as claimed in 16 wherein said searching step is performed without actually computing said ratio.

20. A method as claimed in 16 wherein said searching step is performed without employing a division operation in said searching step.

21. A method as claimed in claim 8 wherein said identifying step comprises the steps of:
   storing samples from a received signal for one frame duration;

initializing a variable I, whose value at the $m^{th}$ chip position is denoted $I^{(m)}$ to a first chip point of said fame duration;

correlating each of the spread spectrum codewords that could fit within a time slot duration starting at a particular chip point m with the spread spectrum sequence;

squaring the output of each correlation performed in said correlating step;

summing the squared outputs to develop X(k);

obtaining an energy estimate over said time slot duration P(k);

setting I to the value of the next chip position m+1 when $$X(m+1)P(I^{(m)}) > X(I^{(m)})P(m+1);$$

repeating the correlating, squaring, summing, obtaining, and setting steps for each subsequent chip in said frame duration; and identifying as said chip position the chip in position I.

22. A method as claimed in claim 21 wherein a receiver input power level is adjusted using energy estimate P(I).

23. A method as claimed in claim 8 wherein said identifying step comprises the steps of:

identifying said at least one of said time slots that is spread spectrum encoded, said identified at least one time slot including at least a plurality of codewords each made up of a plurality of samples which are treated as chips;

for each chip in said identified time slot correlating between a spreading code stored for said receiver and previous chips that number the same as the length of said spreading code;

downsampling said correlator outputs by a number of chips in said spreading code to produce a downsampled symbol stream; and performing frequency offset estimation processing on said downsampled symbol stream at said downsampled rate.

24. A method as claimed in claim 23 further comprising the step of repeating said correlating, downsampling, and performing steps.

25. A method as claimed in claim 23 further comprising the step of repeating said identifying said at least one of said time slots, correlating, downsampling, and performing steps.

26. A method as claimed in claim 23 wherein in said correlating step, any chip values required that precede said time slot are taken as being zero (0).

27. A method as claimed in claim 23 wherein timing of said downsampling step is a function of frame timing for said frames.

28. A method as claimed in claim 23 further comprising the step of extracting information from said at least one time slot that contains information that is spread spectrum encoded and said at least one lime slot that is not spread spectrum encoded.

* * * * *